(12) United States Patent
Sugawara (10) Patent No.: US 10,758,031 B2
(45) Date of Patent: Sep. 1, 2020

(54) STRAP

(71) Applicant: Sakura Sugawara, Tokyo (JP)

(72) Inventor: Sakura Sugawara, Tokyo (JP)

( * ) Notice: Subject to any disclaimer, the term of this patent is extended or adjusted under 35 U.S.C. 154(b) by 0 days.

(21) Appl. No.: 15/579,252

(22) PCT Filed: Jun. 3, 2015

(86) PCT No.: PCT/JP2015/066100
§ 371 (c)(1),
(2) Date: Dec. 4, 2017

(87) PCT Pub. No.: WO2016/194187
PCT Pub. Date: Dec. 8, 2016

(65) Prior Publication Data
US 2018/0153283 A1    Jun. 7, 2018

(51) Int. Cl.
*A45F 3/14* (2006.01)
*A45C 13/26* (2006.01)
(Continued)

(52) U.S. Cl.
CPC ............... *A45F 3/14* (2013.01); *A41D 23/00* (2013.01); *A45C 13/26* (2013.01); *A45C 13/30* (2013.01);
(Continued)

(58) Field of Classification Search
CPC .............. A41D 23/00; A41D 2023/004; G03B 17/561; G03B 17/56; A45F 2003/142; A45F 2200/0533; A45F 3/14; A45F 3/005; A45F 13/30; A45F 3/02; A45F 5/00; A45F 2005/006; A45C 13/26; A45C 13/30
(Continued)

(56) References Cited

U.S. PATENT DOCUMENTS

| 3,605,121 A * | 9/1971 | Suzuki | A41D 23/00 2/207 |
| 2011/0036878 A1* | 2/2011 | Cartwright | A45C 13/30 224/264 |

(Continued)

FOREIGN PATENT DOCUMENTS

| CN | 204218162 U | 3/2015 |
| JP | 152994 | 4/1984 |

(Continued)

OTHER PUBLICATIONS

Extended European Search Report, European Patent Office, dated Oct. 18, 2018.
Notices of Reasons for Rejection, State Intellectual Property Office of People's Republic of China, dated Oct. 30, 2019.
Search Report, State Intellectual Property Office of People's Republic of China, dated Oct. 30, 2019.

*Primary Examiner* — Nathan J Newhouse
*Assistant Examiner* — Matthew T Theis
(74) *Attorney, Agent, or Firm* — Bay State IP, LLC (57) ABSTRACT

Provided is a strap capable of reducing a burden applied to the neck and shoulder, having a sufficient strength to hold the object being carried, and having an excellent design. A strap (1) includes a strap portion (10) to be placed on the neck and shoulder, and a plurality of fasteners (16A, 16B) attached to the object being carried (50, 60) while the fasteners fastening both ends of the strap portion (10). The strap (1, 2) is characterized in that the strap portion (10) is formed by sewing two or more rectangular stoles (11, 12) along the longitudinal direction.

3 Claims, 9 Drawing Sheets

(51) Int. Cl.
*G03B 17/56* (2006.01)
*A41D 23/00* (2006.01)
*A45C 13/30* (2006.01)
*A45F 3/02* (2006.01)
*A45F 5/00* (2006.01)

(52) U.S. Cl.
CPC .................. *A45F 3/02* (2013.01); *A45F 5/00* (2013.01); *G03B 17/56* (2013.01); *G03B 17/561* (2013.01); *A45F 2003/142* (2013.01); *A45F 2005/006* (2013.01); *A45F 2200/0533* (2013.01)

(58) Field of Classification Search
USPC ................................ 224/257, 610; 2/91, 207
See application file for complete search history.

(56) References Cited

U.S. PATENT DOCUMENTS

2013/0047316 A1* 2/2013 Gillan .................. A44C 15/005
2/207
2013/0048695 A1* 2/2013 Do ............................ A45F 3/14
224/676

FOREIGN PATENT DOCUMENTS

| JP | H09-109814 A | 4/1997 |
| JP | 2008-200408 A | 9/2008 |
| JP | 2012-103736 | 5/2012 |
| JP | 3175830 U | 5/2012 |
| JP | 3194006 | 10/2014 |
| WO | 2009029932 A1 | 3/2009 |

* cited by examiner

STRAP

CROSS REFERENCE TO RELATED APPLICATION

This application is for entry into the U.S. National Phase under § 371 for International Application No. PCT/JP2015/066100 having an international filing date of Jun. 3, 2015, and from which priority is claimed under all applicable sections of Title 35 of the United States Code including, but not limited to, Sections 120, 363, and 365(c).

TECHNICAL FIELD

The present invention relates to a strap for carrying baggage for carrying electronic equipment such as a camera and music equipment such as a guitar and bags, and more particularly relates to a strap used by hanging on a neck or a shoulder.

BACKGROUND ART

Conventionally, there is a camera strap (so-called neck strap) used by hanging on a neck or a shoulder. Such a neck strap is composed of a belt-like hanging strap portion which holds the left and right ends of the camera and can be hung on the neck or shoulder, and a fastener for fastening both end portions of the hanging string portion. Here, when holding a heavy camera like a single lens reflex camera, it is necessary to select a material having sufficient strength to withstand the load of the camera. For this reason, in the camera strap, the material of the hanging strap is made of strong resin, leather, tightly woven cloth, and narrow width is common. For example, in the neck-hanger type camera strap disclosed in Patent Document 1, the cloth hanging string portion has a narrow width.

In this way, since the belt-shaped hanging strap portion is narrow in width, when the camera strap is hooked on the neck or shoulder, there is a possibility that the hanging strands bites into the neck or the shoulder and hurts the neck and shoulders. Therefore, in order to disperse the load when the strap is hung on the neck or shoulder, there is one in which the hanging strap portion is widened. For example, the hanging strap portion of the strap disclosed in Patent Document 2 is made of a stall which is a single wide cloth.

RELATED ART DOCUMENTS

Patent Documents

Patent Document 1: Japanese Patent Laid-Open No. 2012-103736
Patent document 2: Japanese Registered Utility Model No. 3194006

DISCLOSURE OF THE INVENTION

Problems to be Solved by the Invention

However, in the case where the hanging strap portion of the strap is only made into a wide cloth, there is a problem in that it is restricted to a case where it is attached to a relatively small and lightweight carried object such as a camera in terms of strength. For this reason, it was necessary to sufficiently maintain the strength of the hanging strap portion when attaching the strap to a larger carried object. Further, in the case of constructing the hanging string portion with one cloth, there is a problem that if the pattern of one cloth is the same, the design of the hanging strap portion is poor.

The present invention has been made in view of the above problems, and it is an object of the present invention to provide a strap reducing a burden on a neck and a shoulder, having a sufficient strength for holding a carried object, and having excellent design.

Means of Solving the Problems

In order to solve the above problem, the present invention is a strap (1, 2) having a hanging portion (10) to be hung on a neck or a shoulder and a plurality of fasteners (16A,16B) fastened to both end portions of the hanging portion (10) and attached to a carried object (50, 60), and the hanging portion (10) is formed by stitching two or more rectangular cloths (11, 12) in a longitudinal direction. When wider fabrics (11, 12) are used for the hanging portion (10), the portion hitting the neck or the shoulder becomes wider, so that the weight of the carried object (50, 60) is dispersed. In this way, the burden on the neck and shoulders can be reduced.

In addition, when two or more cloths (11, 12) are stitched in the longitudinal direction, sewing portions (S1, S2) are formed in the entire region in the direction in which the tension of the hanging portion (10) is generated when the load from the carried object (50, 60) is applied to the hanging portion (10). This increases the proof stress against loads from the carried object (50, 60). Since the hanging portion (10) is composed of two or more cloths (11, 12), after scratching the surface of any one of the cloths (11, 12), even if the scratch becomes large due to the load on the hanging portion (10), it is possible to stop the scratches from being expanded at the sewn portions (S1, S2). Therefore, the safety of the hanging portion (10) is enhanced. Thereby, it has sufficient strength to hold the carried object (50, 60).

Further, if it is constituted by sewing two or more cloths (11, 12), if two or more cloths (11, 12) are made to have different patterns, it is possible to form more various patterns as compared with the case where it is constituted by one piece of cloth and it can be made excellent in designability. Therefore, according to the straps (1, 2) of the present invention, the straps (1,2) reduces the burden on the neck and shoulder, has sufficient strength to hold objects to be carried, and is also excellent in design.

In the strap (1) having the above configuration, the strap (1) may having bag-shaped portions (13) which are formed at both end portions in the longitudinal direction of the hanging portion (10), the bag-shaped portions (13) are formed by sewing an inclined portion (11a, 12a) formed by cutting two corners (11X, 12X) on the diagonal of the two or more sutured cloths (11, 12) and an end portion (11b, 12b) parallel to the longitudinal direction, and an opening portion (14) of the bag-shaped portions (13) is formed at a central portion in the longitudinal direction of the hanging portion (10). In this way, by forming the bag-shaped portions (13) at both longitudinal end portions of the hanging portion (10), a small package such as accessories of the carried object (50) can be passed through the opening portion (14) and housed in the bag-shaped portions (13).

Further, by forming the bag-shaped portions (13) by sewing the cloth (11, 12) to each other, there is no need to separately prepare a cloth for forming the bag-shaped portions, and the number of members is not required. In addition, by forming the bag-shaped portions (13) only by mutually sewing the cloth (11, 12) at both end portions in the longitudinal direction, the shape of the bag-shaped portions (13) is not emphasized and the function and designability of the cloth (11, 12) are not impaired. Also, by cutting off the corner portions (11X, 12X), inclined portions (11a, 12a) are formed at the end portions in a direction intersecting with the longitudinal direction. When sewing the end part which is inclined with respect to the longitudinal direction and the end part parallel to the longitudinal direction, the cloth (11, 12) is naturally wrapped around both ends of the hanging part (10), thereby forming the bag-shaped portions (13). For this reason, it is a natural design and the design is not impaired.

Further, by making the central portion in the longitudinal direction of the hanging portion (10) to be the opening portion (14), the central portion becomes wider, so that the weight of the carried object (50) is dispersed in the central portion to be hung on the neck or the shoulder. In this way, the burden on the neck or the shoulder can be reduced.

Moreover, by using the stall on the strap, it is possible to improve the fashionability by the pattern of the strap, and it can also be used as a cover for protection enveloping the carried object, there is a merit that the strap can have functionality.

In the strap (1) having the above configuration, the end portion on the side of the opening (14) side of the bag-shaped portions (13) may be a folded portion (11c) to be sewn by folding in pleated state one cloth (11, 12) of two cloths (11, 12). In this manner, by performing so-called gathering, in which one of the cloths (11, 12) are folded in pleated state at the end portion of the bag-shaped portions (13) on the side of the opening portion (14), the bag-shaped portions (13) becomes more stereoscopic with a simple configuration. Therefore, the storage capacity of the bag-shaped portions (13) can be increased.

In the strap (2) having the above configuration, the hanging portion (10) may be formed in an endless annular shape by sewing two or more rectangular cloths (11, 12) in the longitudinal direction and sewing both end portions in the longitudinal direction. With such a configuration, the width of the hanging portion (10) between the fasteners (16A, 16B) becomes the width of two cloths and becomes wider, so that the weight of the carried object (60) is dispersed. As a result, the burden on the neck and shoulders can be further reduced. It is to be noted that the reference numerals in parentheses above indicate the reference numerals of the corresponding constituent elements of the embodiments described later as an example of the present invention.

Effects of the Invention

According to the strap of the present invention, it is possible to reduce the burden on the neck or the shoulder, have sufficient strength to hold the carried object, and have excellent design. In addition, by using cloth for the strap, it is possible to improve the fashionability by the pattern of the strap, and it can also be used as a cover for protection wrapping the object to be conveyed, so that it can have functionality.

MODE FOR CARRYING OUT THE INVENTION

First Embodiment

Figure 1:
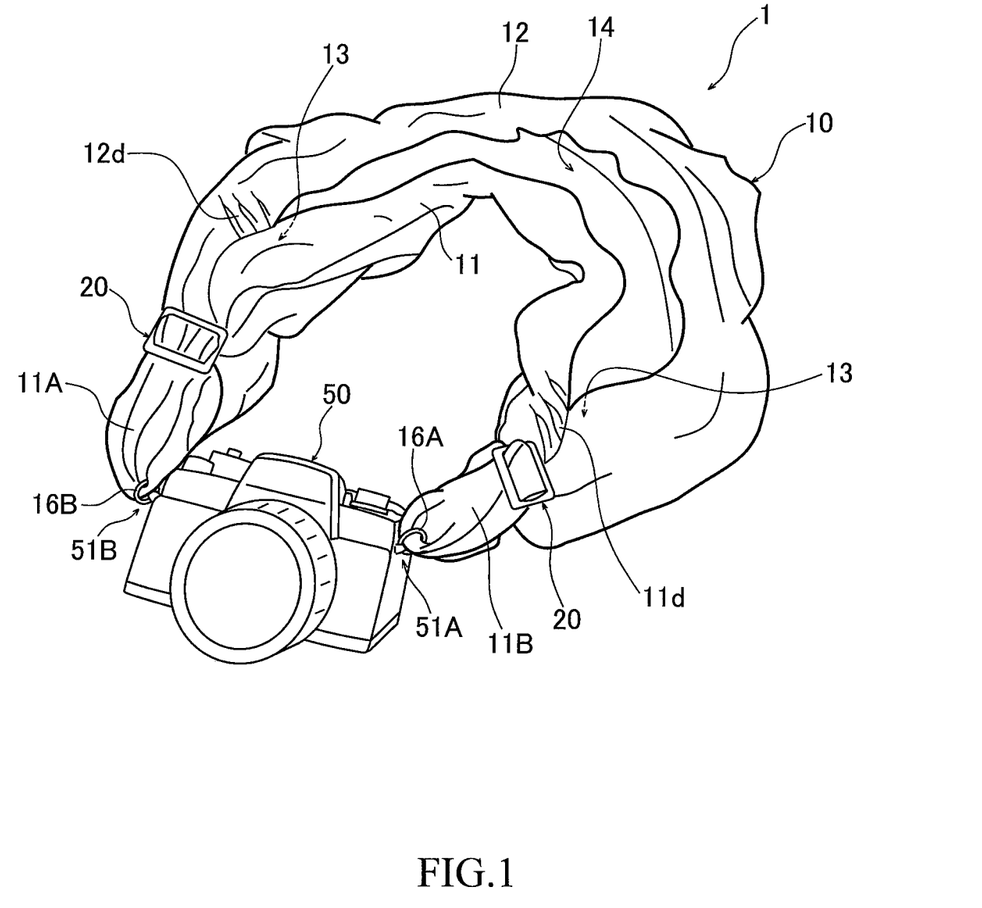
FIG. 1 is an overall perspective view of a strap according to a first embodiment of the present invention.

Hereinafter, an embodiment of the present invention will be described in detail with reference to the appending drawings. FIG. 1 is an overall perspective view of a strap according to a first embodiment of the present invention. As shown in FIG. 1, the strap 1 includes a hanging portion 10 constituted by stalls 11 and 12 which are wide and thin cloths, a pair of annular members (fasteners) 16A, 16B for fixing the pair of fixed portions 11A, 11B of the hanging portion 10, and an end adjusting member 20 for adjusting the length of the end portion of the hanging portion 10.

The strap 1 is attached to a carried object 50 such as a camera at the fixing portions 11A and 11B at both ends thereof. In the present embodiment, a camera is exemplified as the carried object 50, but it may be other than the camera. For example, the strap 1 can be a guitar strap by attaching the strap 1 directly to a guitar. In addition, the strap 1 may be attached to a case of a surfboard case, a sports bag such as a golf bag, or a case of an instrument such as a guitar case.

The hanging portion 10 is attached by fixing the annular members (ring members) 16A, 16B attached to the fixed portions 11A, 11B to the fixtures 51A, 51B formed on the left and right side portions of the carried object 50. The hanging portion 10 is composed of a wide stall (cloth) spreading over the neck or the shoulder, and its outer shape is rectangular in the expanded state. The hanging portion 10 of the present embodiment is formed by stitching two stalls 11, 12 of two different patterns in a rectangular shape in the longitudinal direction.

The length of the hanging portion 10 differs depending on the carried object 50. For example, when the carried object 50 is a camera, when the central portion of the hanging portion 10 is hung around the neck, it is preferable that the length of the hanging portion 10 is such a length that the carried object 50 comes from the user's chest to abdomen. Therefore, the width and the length of the hanging portion 10 are preferably about 40 to 100 cm or about 70 to 170 cm which is the size of a general stall. Therefore, the width of each stall 11, 12 is preferably about 20 to 50 cm.

In addition, for the material of the stalls 11, 12 constituting the hanging portion 10, a material which is lightweight and can secure strength such as silk and chiffon is used. Here, since the hanging portion 10 needs strength, it is more preferable that the material of the stalls 11, 12 is a mixture of synthetic fibers such as polyester, and more preferred is one in which the weaving of the dough is fine. However, it is not limited to this, and hemp or cotton may be used depending on the type of the carried object.

In addition, it is preferable to apply waterproofing or UV processing to the stall of the neck type hanging portion 10 as necessary in order to prevent sunburn of the neck. In addition, the specific processing method changes according to the product concept. For example, since the silk material has a property of absorbing ultraviolet rays, it is not necessary to apply UV processing when using the hanging portion 10 of silk material.

At both ends in the longitudinal direction of the hanging portion 10, the bag-shaped portion 13 is formed by sewing the stalls 11, 12 to each other. A specific production method will be described in detail later. Also, an opening portion 14 of the bag-shaped portion 13 is formed in the center portion in the longitudinal direction of the hanging portion 10. The opening portion 14 has not only the function of opening for accessing the bag-shaped portion 13 but also the effect that a wide portion is secured by taking many places not formed in a bag shape at the center of the hanging portion 10.

At the end of the bag-shaped portion 13 on the side of the opening portion 14, processing is performed such that one of the two stalls 11, 12 is folded in pleated state (also called gathered processing), and the folded portions 11c, 12c are formed. In FIG. 1, at the end of the bag-shaped portion 13 on the left side on the side of the opening portion 14, the above-mentioned processing is performed on the side of the stall 12, while at the end of the bag-shaped portion 13 on the right side on the side of the opening portion 14, the above-mentioned processing is performed on the side of the stall 11. By carrying out this processing, the bag-shaped portion 13 becomes more stereoscopic easy.

Figure 2:
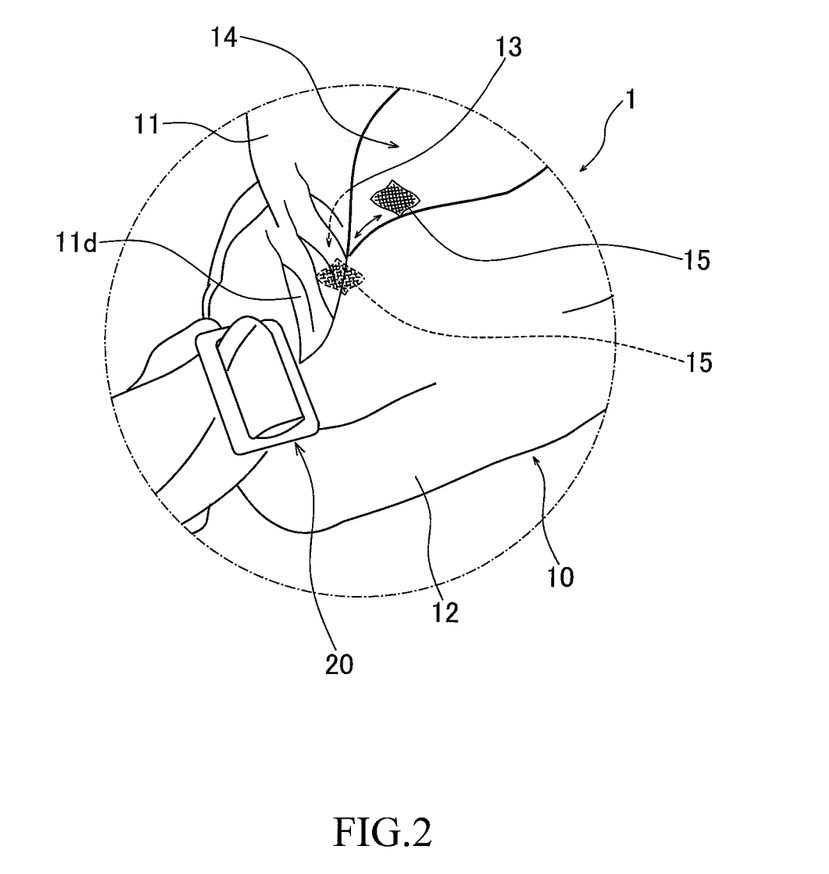
FIG. 2 is a diagram showing another configuration example of a hanging portion.

By the way, although the above-described hanging portion 10 is not provided with any member at the opening 14 side end portion of the bag-shaped portion 13, it is not limited thereto. FIG. 2 is a diagram showing another configuration example of the hanging portion 10. For example, as shown in FIG. 2, on the inner side of the end portion of the bag-shaped portion 13 on the side of the opening portion 14, a fixing member 15 that can be engaged with each other, such as a surface fastener or a snap fit, may be provided. When the fixing members 15 are engaged with each other in the vicinity of the opening portion 14 of the hanging portion 10, the opening of the bag-shaped portion 13 can be closed, and it is possible to prevent the stored item stored in the bag-shaped portion 13 from falling. It should be noted that the invention is not limited to one that is fastened by a single point, and an opening and closing member such as a fastener capable of continuously closing a part or the whole of the opening and closing member may be disposed.

Figure 3:
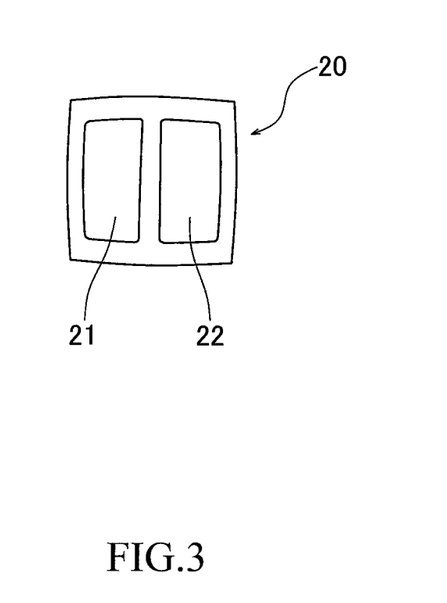
FIG. 3 is a view showing a structure of a fastener of the strap.

FIG. 3 is a view showing the structure of the end adjusting member 20 of the strap 1. As shown in FIG. 3, two holes (the first insertion hole 21 and the second insertion hole 22) are formed in the end adjusting member 20 in order to pass the fixing portions 11A, 11B of the hanging portion 10 and the vicinity thereof plural times. The material of the end adjusting member 20 is made of metal, resin, leather, hard cloth, etc., and is not particularly specified.

Figure 4:
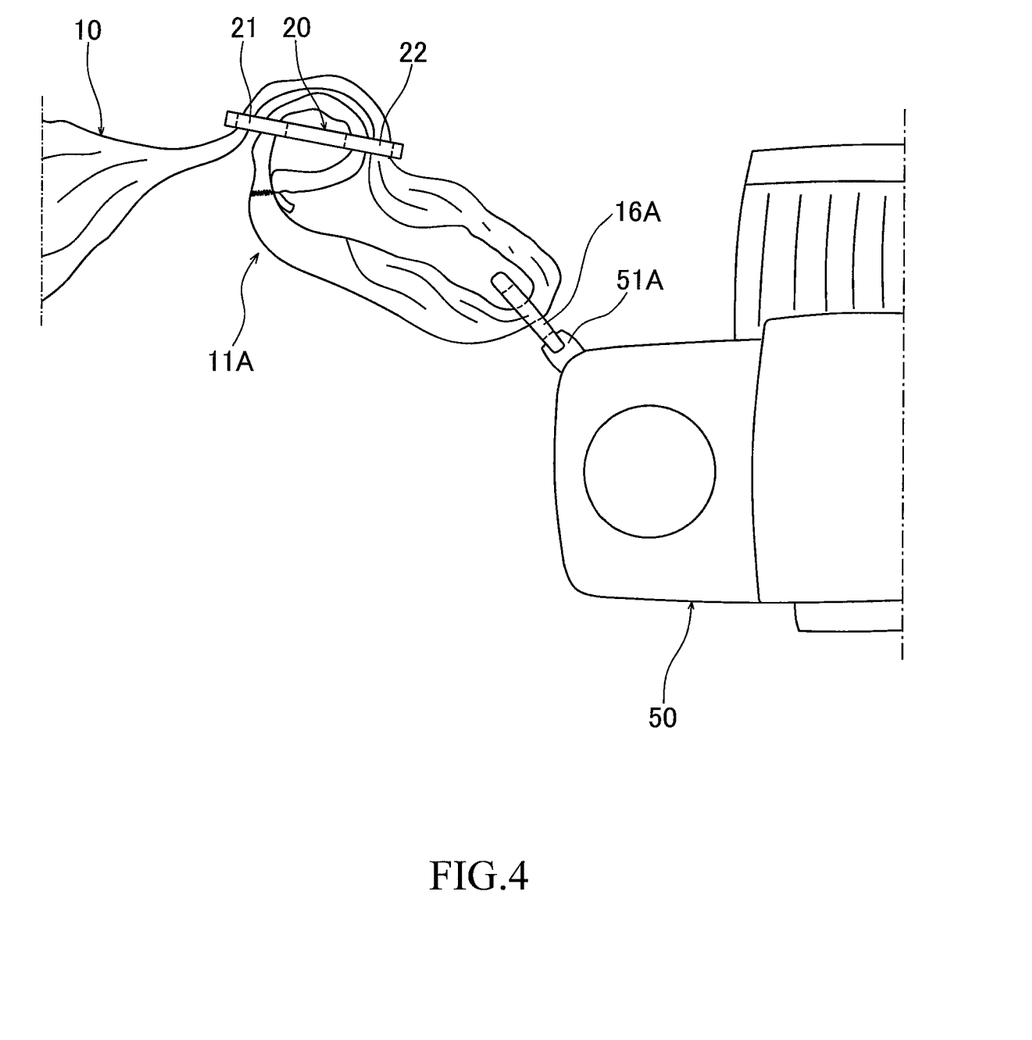
FIG. 4 is a view for explaining a state in which a fixed portion of the hanging portion is attached to a fixture of a carried object.

FIG. 4 is a view for explaining a state in which the fixed portion 11A, 11B of the hanging portion 10 is attached to a fixture 51A of a carried object 50. Hereinafter, the structure of one of the fixing portions 11A side of the hanging portion 10 will be described, but the fixing portion 11B side has the same configuration. As shown in FIG. 4, by attaching the annular member 16A inserted through the fixed portion 11A of the hanging portion 10 to the fixture 51A provided on the left and right side portions of the carried object 50, the strap 1 is attached to the carried object 50.

The procedure for fixing the hanging portion 10 to the fixed portion 11A and the annular member 16A is as follows. First, the fixing portion 11A is passed through the first insertion hole 21 and the second insertion hole 22 of the end adjustment member 20 in this order. Thereby, the fixed portion 11A is fixed to the end adjusting member 20. After that, the distal end of the fixed portion 11A is passed through the annular member 16A, then passed through the first insertion hole 21 and the second insertion hole 22 of the end adjustment member 20 again, and is sutured to the side surface of the fixed portion 11A itself and fixed.

Figure 5A:
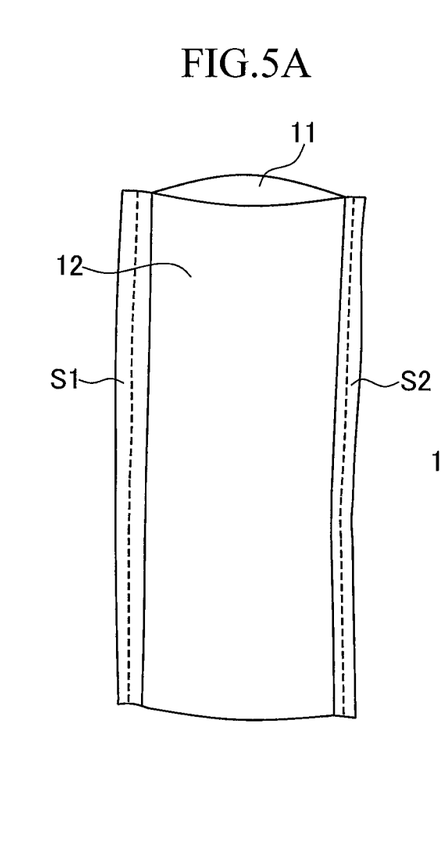
FIG. 5A is a view showing a manufacturing process of the hanging portion of the first embodiment.
Figure 5B:
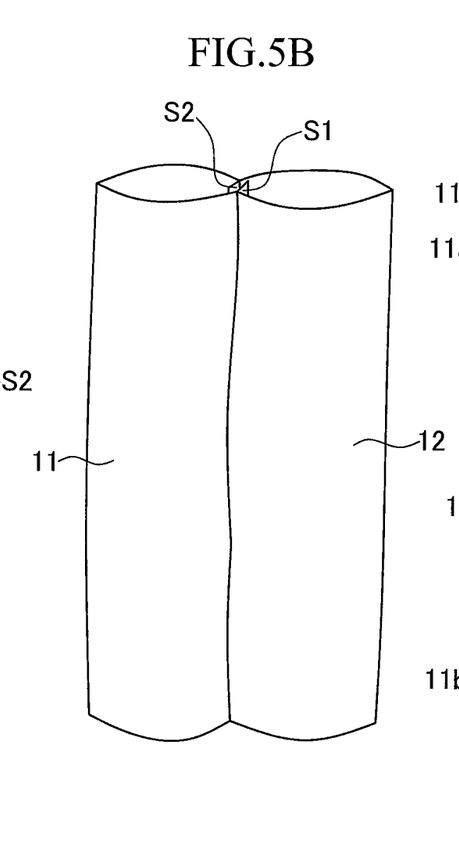
FIG. 5B is a view showing a manufacturing process of the hanging portion of the first embodiment.
Figure 5C:
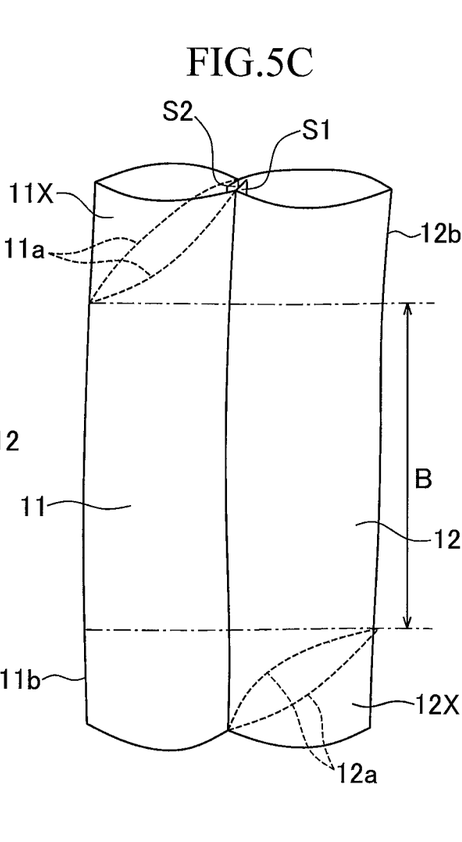
FIG. 5C is a view showing a manufacturing process of the hanging portion of the first embodiment.
Figures 6A, 6B:
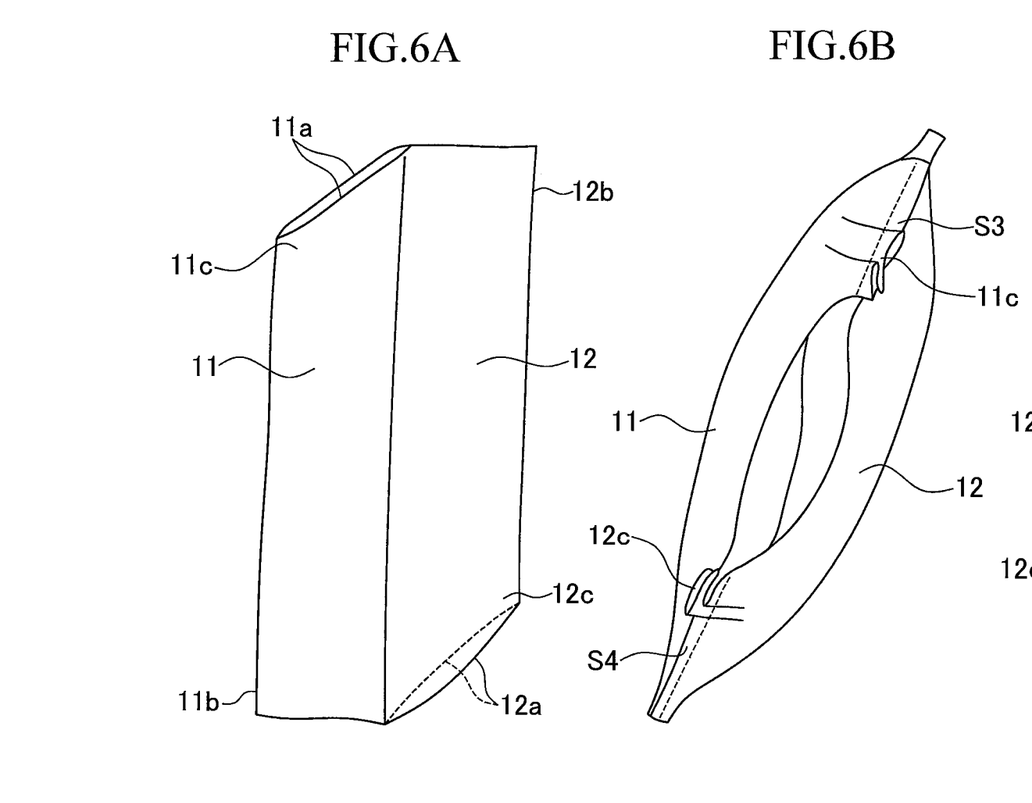
FIG. 6A is a view showing the manufacturing process of the hanging portion of the first embodiment.
FIG. 6B is a view showing the manufacturing process of the hanging portion of the first embodiment.
Figure 6C:
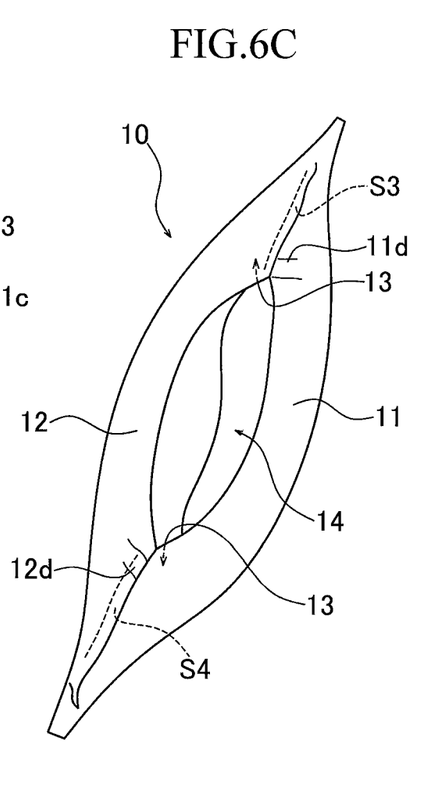
FIG. 6C is a view showing the manufacturing process of the hanging portion of the first embodiment.

Next, a specific manufacturing method of the hanging portion 10 will be described with reference to FIGS. 5 and 6. FIG. 5 and FIG. 6 are views showing manufacturing steps of the hanging portion of the first embodiment. First, as shown in FIG. 5A, opposed long sides of a rectangular stall 11 and a stall 12 having the same shape are sewn together. As a result, the two rectangular stalls 11, 12 are stitched in the longitudinal direction. The sewn portions are referred to as a first sewn portion S1 and a second sewn portion S2, respectively.

When the inner surface and the outer surface of the integral stalls 11, 12 are reversed, the first seamed portion S1 and the second seamed portion S2 are hidden on the inner surface, as shown in FIG. 5B. As a result, the first sewn portion S1 and the second sewn portion S2 of the hanging portion 10 are invisible from the surface side and the design is excellent. Here, in the present embodiment, when inverting the inner and outer surfaces of the stalls 11, 12, it is preferable to dispose the first seamed portion S1 and the second seamed portion S2 so as to overlap each other as shown in FIG. 5B, because the next operation is easy to perform.

Next, as shown in FIG. 5C, two cut portions (corner portions) 11X and 12X on the diagonal of the two mutually sewn stalls 11 and 12 arranged as described above are cut off, respectively. It is preferable that the cutout portions 11X and 12X cut off the end portions at diagonal positions. Here, the cut portions 11X and 12X may have inclined portions 11a and 12a inclined with respect to the longitudinal direction, and the angles of the inclined portions 11a and 12a and the size of the cutout portions 11X and 12X are not limited to the size of showed in FIG. 5C.

Incidentally, between the lower end of the inclined portion 11a and the upper end of the inclined portion 12a, there is a non-inclined region B having both end portions parallel to the first seamed portion S1 and the second seamed portion S2, it is preferable to sufficiently secure the non-inclined region B. In the non-inclined region B, only the end part is sewn and the central part is the part where the neck or the shoulder hits. Therefore, by ensuring the wide non-inclined region B, the region where the load is dispersed is increased.

As shown in FIG. 6A, at the upper end side of the stalls 11, 12, the inclined portion 11a and the right upper end portion 12b which is close to the inclined portion 11a and opposes on the upper end side are sewn. Similarly, on the lower end side of the stalls 11, 12, the inclined portion 12a and the left lower end portion 11b which is close to the inclined portion 12a and opposes on the lower end side are sewn. At the time of suturing, the folded portion 11c, which is the end adjacent to the inner side of the inclined portion 11a, and the folded portion 12c, which is the end adjacent to the inner side of the inclined portion 12a, are folded several times and sewed.

As shown in FIG. 6B, a portion where the inclined portion 11a and the right upper end portion 12b are stitched becomes a third seamed portion S3, and a portion where the inclined portion 12a and the left lower end portion 11b are sewn becomes a fourth seamed portion S4. At this time, the folded portion 11c is sewn as a part of the third seamed portion S3, and the folded portion 12c is sewn as a part of the fourth seamed portion S4.

Here, when the inner surface and the outer surface of the stalls 11, 12 are reversed, the hanging portion 10 shown in FIG. 6C is completed. In this way, finally, by inverting the inner surface and the outer surface of the stalls 11, 12, the third seamed portion S3 and the fourth seamed portion S4 are hidden on the inner surface. As a result, the third sewn portion S3 and the fourth sewn portion S4 forming the bag-shaped portion 13 of the hanging portion 10 cannot be seen from the surface side, and the design is excellent. Incidentally, a corrugated portion 11d recessed in a wave shape is formed on the opposite side of the folded portion 11c, and a corrugated portion 12d recessed in a wave form is formed on the opposite surface of the folded portion 12c. In the present embodiment, since the folded portions 11c and 12c are two, two corrugated portions 11d and 12d are also formed, but the number is not limited thereto.

As described above, in the strap 1 of the first embodiment, the hanging portion 10 is formed by sewing the two rectangular stalls 11, 12 in the longitudinal direction. When stalls 11 and 12, which are wide cloths, are used for the hanging portion 10, the portion hitting the neck or the shoulder becomes wider, so that the weight from the carried object 50 is dispersed. In this way, the burden on the neck and the shoulder can be reduced.

Further, when the two stalls 11, 12 are sewn in the longitudinal direction, the sewn portions S1, S2 are formed in the entire region in the tension generating direction of the hanging portion 10 when the load from the carried object 50 hits the hanging portion 10, the proof stress against the load from the carried object 50 becomes strong. Further, since the hanging portion 10 is composed of two stalls 11, 12, even if one of the stalls 11, 12 is scratched and then the damage to the hanging portion 10 is increased by the load on the hanging portion 10, the expansion of the flaw can be stopped at the sewn portions S1 and S2. Therefore, the safety of the hanging portion 10 is enhanced. Thereby, it has sufficient strength to hold the carried object 50.

Furthermore, since the hanging portion 10 is constituted by sewing the two stalls 11, 12, if the two stalls 11, 12 are made to have different patterns, it is possible to form more various patterns and it can be made excellent in design as compared with the case where the hanging portion 10 is constituted by one stall. Therefore, according to the strap 1 of the present embodiment, it is possible to reduce the burden on the neck or the shoulder, have sufficient strength to hold the carried object, and have excellent design.

Further, by sewing the inclined portion 11a and the right upper end portion 12b of the stalls 11, 12 or the inclined portion 12a and the left lower end portion 11b with each other, the bag-shaped portions 13 are formed at both end portions in the longitudinal direction of the hanging portion 10. In addition, an opening 14 of the bag-shaped portion 13 is formed in the center portion in the longitudinal direction of the hanging portion 10 which is not sewn. In this way, by forming the bag-shaped portions 13 at both end portions in the longitudinal direction of the hanging portion 10, it is possible to accommodate a small package such as an accessory of the carried object 50 in the bag-shaped portion 13 through the opening portion 14.

Further, by forming the bag-shaped portion 13 by stitching the stalls 11, 12, it is not necessary to separately prepare a cloth for forming the bag-shaped portion 13, so that the large number of members is not required. In addition to this, by forming the bag-shaped portion 13 by merely sewing the stalls 11, 12 at both end portions in the longitudinal direction, the shape of the bag-shaped portion 13 is not emphasized and the function and design of the stalls 11 and 12 are not impaired. In addition, by cutting out the cut portions 11X and 12X, the inclined portions 11a and 12a are formed at the end portions in the direction crossing the longitudinal direction of the stalls 11 and 12. In this state, when the end portion inclined with respect to the longitudinal direction and the end portion parallel to the longitudinal direction are sewn together, the bag-shaped portion 13 is naturally formed in such a manner that the stalls 11, 12 are rounded in the longitudinal direction at both end portions of the hanging portion 10. For this reason, it is a natural design and the design is not impaired.

Further, by making the central portion in the longitudinal direction of the hanging portion 10 to be the opening portion 14, the central portion becomes wider, so that the weight from the carried object 50 is dispersed in the central portion to be hung on the neck or the shoulder. In this way, the burden on the neck and the shoulder can be reduced.

Moreover, by using the stall on the strap, it is possible to improve the fashionability by the pattern of the strap, and it can also be used as a cover for protection enveloping the carried object, there is a merit that the strap can have functionality.

The end portion of the bag-shaped portion 13 on the side of the opening portion 14 may be sewn (the third sewn portion S3 and the fourth sewn portion S4) after forming the folded portions 11c, 12c by folding one of the two stalls 11, 12 in pleated state. In this way, by performing so-called gathering, in which one of the stalls 11, 12 is folded in pleated state at the end portion of the bag-shaped portion 13 on the side of the opening portion 14, the bag-shaped portion 13 becomes more stereoscopic with a simple configuration. Therefore, the storage capacity of the bag-shaped portion 13 can be increased.

In the manufacturing process described in this embodiment, when inverting the stitches 11 and 12 sewn in FIG. 5A, as shown in FIG. 5B, after the first sewn portion S1 and the second sewn portion S2 were arranged so as to be in the center portion, the subsequent work was performed. This is a technique for forming the hanging portion 10 such that the pattern of the stall 11 and the pattern of the stall 12 appear equally, and it is not always necessary to perform the subsequent operation after the first sewn portion S1 and the second sewn portion S2 overlaps each other.

Second Embodiment

Figure 7:
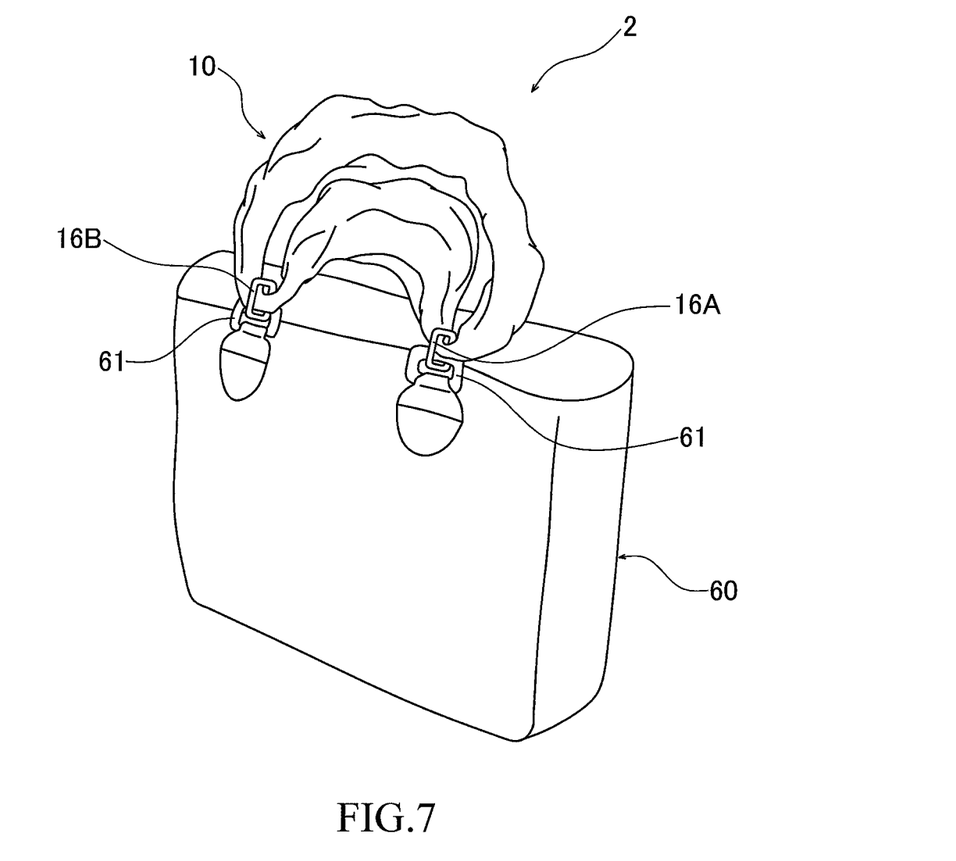
FIG. 7 is an overall perspective view of a strap according to a second embodiment of the present invention.

Hereinafter, a second embodiment of the present invention will be described in detail with reference to the accompanying drawings. FIG. 7 is an overall perspective view of a strap according to a second embodiment of the present invention. Constituent elements similar to those of the above-described embodiment are denoted by the same reference numerals, and description thereof is omitted. In the present embodiment, bags are exemplified as a carried object 60, but the present invention is not limited to this.

Incidentally, in FIG. 7, only the strap 2 attached to the handle on the near side of the bag is shown, but the handle on the back side is constructed similarly.

As shown in FIG. 7, the strap 2 has a hanging portion 10 constituted by a thin fabric stall and two annular members (fasteners) 16 A, 16 B attached to the hanging portion 10. The annular members 16A and 16B are attached to the attachment fitting 61 of the carried object 60. The hanging portion 10 of the present embodiment has a configuration in which both end portions in the longitudinal direction are sewn together. Thus, the hanging portion 10 is formed in an endless annular shape.

Figure 8A:
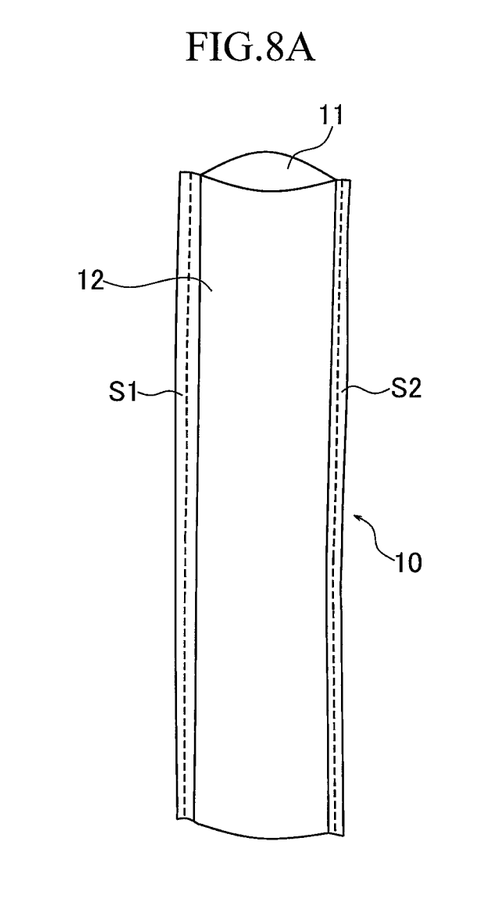
FIG. 8A is a view showing a manufacturing process of a hanging portion according to the second embodiment.
Figure 8B:
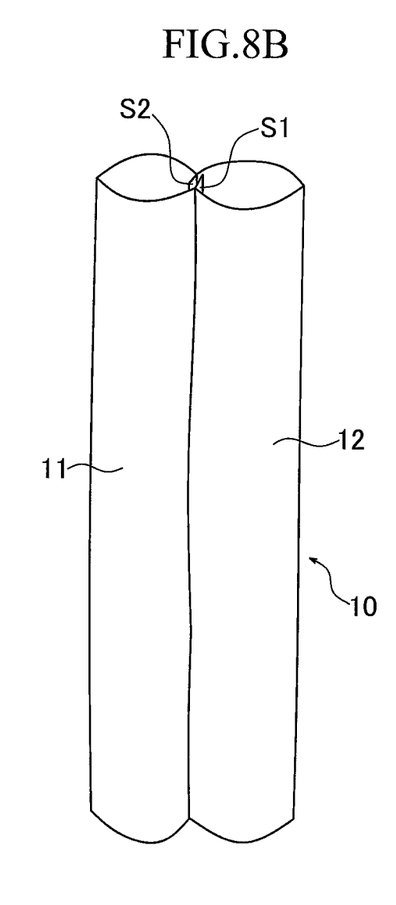
FIG. 8B is a view showing a manufacturing process of the hanging portion according to the second embodiment.
Figure 8C:
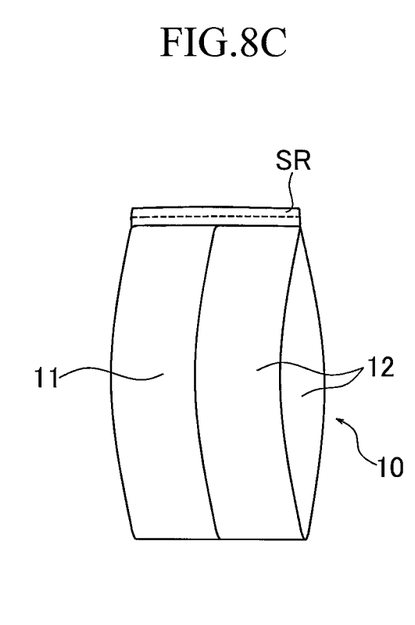
FIG. 8C is a view showing a manufacturing process of the hanging portion according to the second embodiment.
Figure 9A:
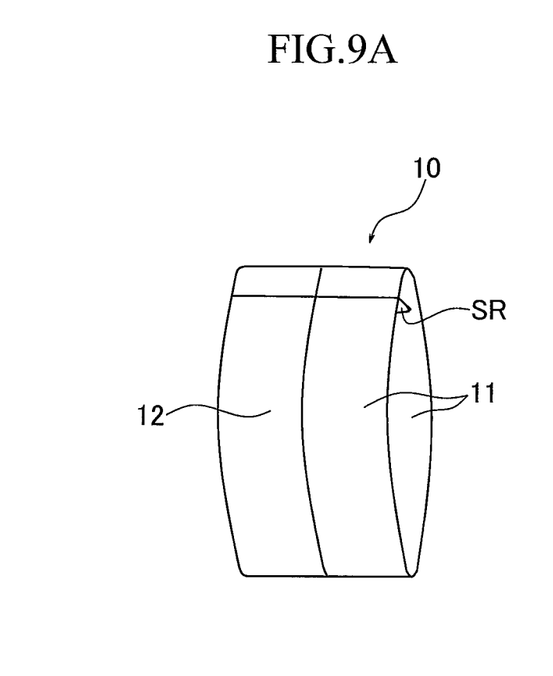
FIG. 9A is a view showing a manufacturing process of the hanging portion according to the second embodiment.
Figure 9B:
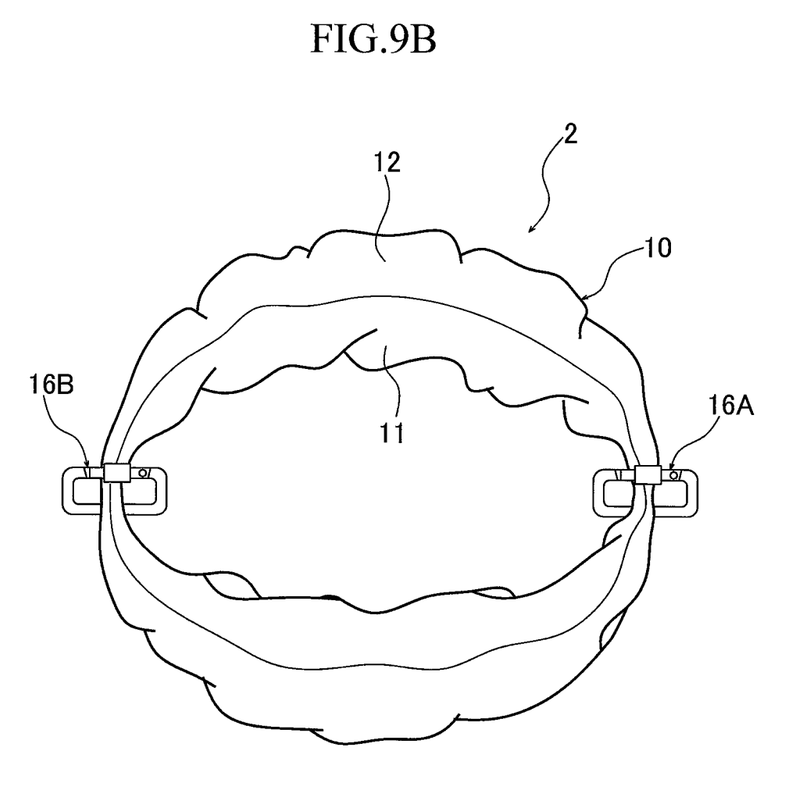
FIG. 9B is a view showing a manufacturing process of the hanging portion according to the second embodiment.

A specific method for manufacturing the hanging portion 10 will be described with reference to FIGS. 8 and 9. FIG. 8 and FIG. 9 are views showing manufacturing steps of the hanging portion 10 of the second embodiment.

First, as shown in FIG. 8A, opposed long sides of a stall 11 and a stall 12 having the same rectangular shape are sewn together. As a result, the two rectangular stalls 11, 12 are stitched in the longitudinal direction. The sewn portions are referred to as a first sewn portion S1 and a second sewn portion S2, respectively.

Then, when the inner surface and the outer surface of the integral stalls 11, 12 are reversed, the first seamed portion S1 and the second seamed portion S2 are hidden on the inner surface, as shown in FIG. 8B. As a result, the first sewn portion S1 and the second sewn portion S2 of the hanging portion 10 disappear from the surface side. Up to this point are the same procedures as in the above-described embodiment.

Next, as shown in FIG. 8C, the upper end and the lower end which are both ends of the stalls 11, 12 are sewn together at the sewn portion SR. Thus, the hanging portion 10 is formed in an endless annular shape. Then, when the inner surface and the outer surface of the integral stalls 11, 12 are reversed, the sewn portion SR is hidden on the inner surface, as shown in FIG. 9A. As a result, the sewn portion SR of the hanging portion 10 becomes invisible from the front surface side, and the design is excellent.

Finally, as shown in FIG. 9B, by attaching the annular members 16A, 16B to two portions of the annular hanging portion 10, the strap 2 is formed. In the present embodiment, annular members 16A and 16B are used which have seams such as hooks and carabiners and are capable of inserting/removing the strap 2 at the seam. In addition, the seam is provided with a removal preventing member for preventing the retainer from coming off.

In addition, when annular members 16A and 16B having a seamless ring shape or the like are attached to the hanging portion 10, it is necessary to be attached to the hanging portion 10 before the hanging portion 10 becomes an endless shape. That is, between the step shown in FIG. 8B and the step shown in FIG. 8C, it is necessary to pass the two annular members 16A, 16B from the end of the hanging portion 10.

As described above, in the strap 2 of the second embodiment, the hanging portion 10 is formed by sewing the two rectangular stalls 11, 12 in the longitudinal direction. Therefore, as in the above-described embodiment, it is possible to reduce the burden on the neck or the shoulder, have sufficient strength to hold the carried object, and have excellent design.

In addition, in the present embodiment, since the width of the hanging portion 10 between the annular members 16A, 16B becomes two stalls 11, 12 and becomes wider, the weight of the carried object 60 is more dispersed. As a result, the burden on the neck or the shoulder can be further reduced.

In the manufacturing process described in the present embodiment, when inverting the stitches 11 and 12 sewn in FIG. 8A, as shown in FIG. 8B, after the first sewn portion S1 and the second sewn portion S2 are arranged so as to be in the center portion, the subsequent work is performed, but similarly to the above, the present invention is not limited thereto.

Though the embodiments of the present invention are as described above, the present invention isn't limited to the above-mentioned embodiments, and various deformations can be achieved within a scope of the technical ideas described in Claims, Specification, and Drawings. Particularly, in the above-described embodiment, the number of stalls 11, 12 has been described as two, but it is not limited to this, it may be plural, and may be two or more. Further, the length and width of the stalls 11, 12 can be appropriately changed depending on the size of the carried object. The type and size of objects to be carried can be changed as appropriate.

The invention claimed is:

1. A camera strap for hanging a camera on a neck or a shoulder, the camera strap comprising:
    a hanging portion which is comprised of a two or more rectangular cloths to be hung on the neck or the shoulder; and
    a plurality of fasteners fastened to both end portions of the hanging portion and attached to a camera; and
    enclosed portions which are formed at both end portions in the longitudinal direction of the hanging portion,
    wherein the hanging portion and the enclosed portions are formed by:
        sewing the opposing long sides of the two or more rectangular cloths and reversing inner surface and outer surface thereof, to form a first workpiece having a tubular shape and a rectangular shape in a folded state;
        forming a non-inclined portion and an inclined portion for each end portion of the first workpiece by cutting off two corners on the diagonal of the rectangular shape of the first workpiece;
        sewing the non-inclined portion and the inclined portion for each end portion of the first workpiece to form a second workpiece; and
        reversing inner surface and outer surface of the second workpiece to form an opening portion of the enclosed portions in a central portion in the longitudinal direction of the hanging portion.

2. The camera strap according to claim 1, wherein a folded portion is formed at an end portion of the enclosed portions on the side of the opening portion, in which one of the two or more rectangular cloths is folded in pleated state.

3. The camera strap according to claim 1, wherein the hanging portion is formed in an endless annular shape by sewing both longitudinal ends thereof.

* * * * *